July 10, 1945.　　　　J. H. ROETHEL　　　　2,379,922
WINDOW CONTROL MECHANISM
Filed Oct. 3, 1940　　　　2 Sheets-Sheet 1
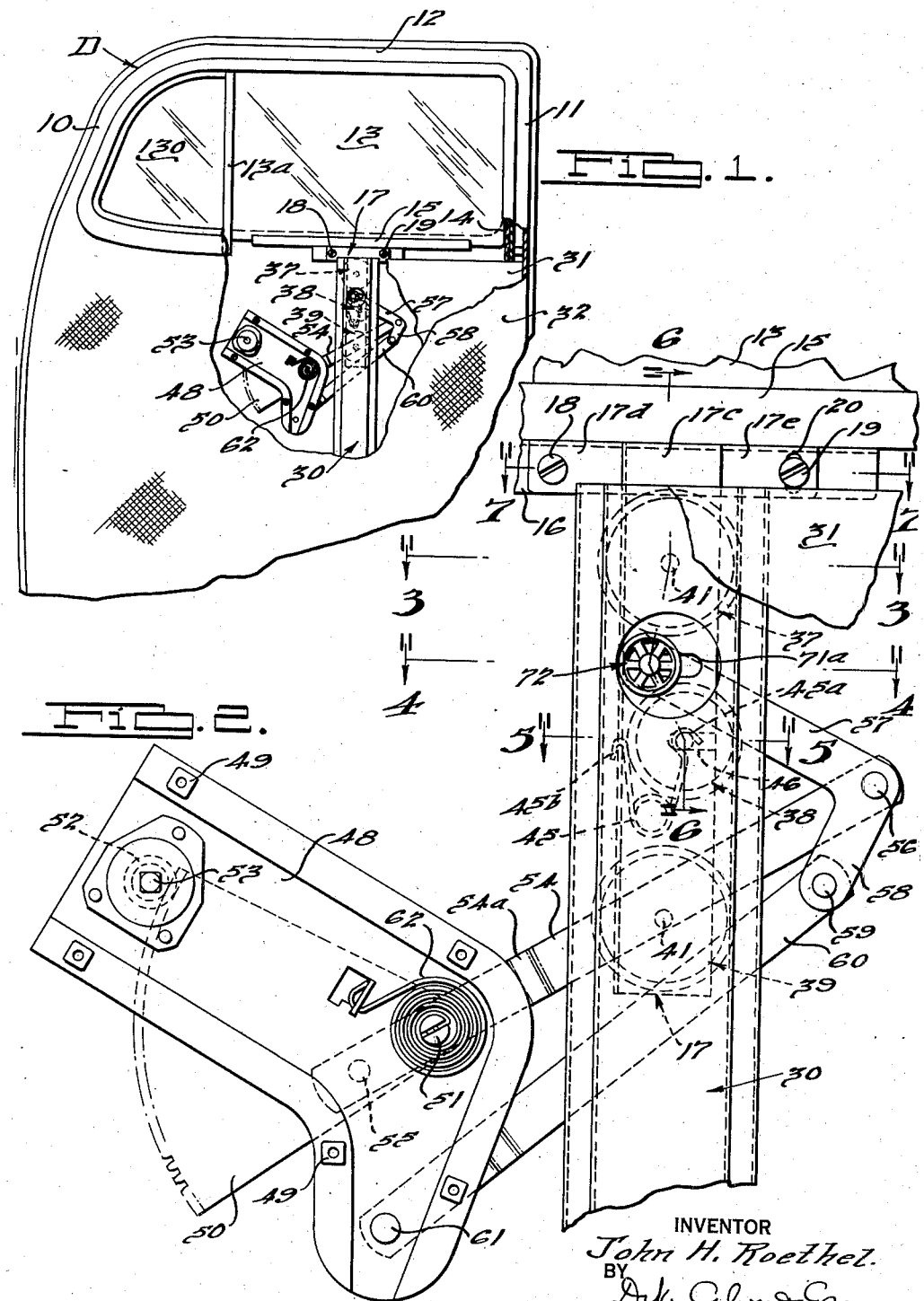
INVENTOR
John H. Roethel.
BY
ATTORNEYS

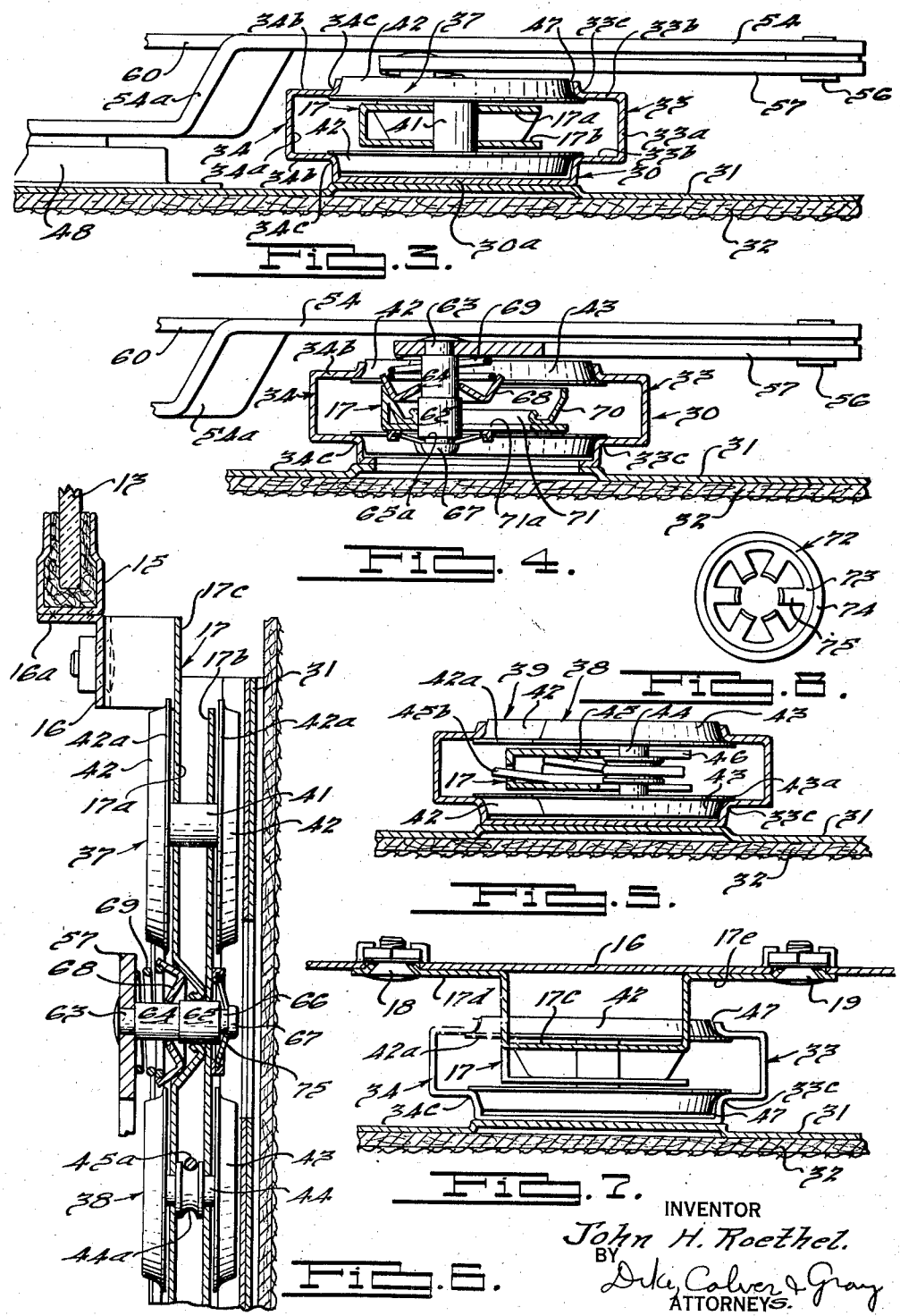

Patented July 10, 1945

2,379,922

UNITED STATES PATENT OFFICE 2,379,922

WINDOW CONTROL MECHANISM

John H. Roethel, Detroit, Mich., assignor to Marvel Equipment Corporation, Detroit, Mich., a corporation of Michigan Application October 3, 1940, Serial No. 359,520

13 Claims. (Cl. 296—48)

This invention relates to window control mechanism, particularly although not exclusively adapted for use in connection with vehicles and especially automobiles. In general the invention contemplates the provision of improved means for guiding the window panel in the desired path, usually in a vertical direction in connection with the principal windows of present day automobiles.

Another object of the invention is to provide guiding means for guiding the window panel, such guiding means including improved guide devices or roller guide devices cooperable with fixed guides within the window well and effective not only to hold the window panel against any appreciable tilting in its plane but also to reduce to a minimum frictional resistance to the travel of the panel, thus minimizing the power required to operate the window panel.

A further object of the invention is to provide improved guiding means for the window glass or panel which may be arranged below and near the center of the panel, the improved construction of the guiding means being such as to hold the window panel for travel in a straight line path against any material tendency to tilt or cock or shift transverse to its plane.

It is also an object of the invention to provide improved roller guide mechanism for a sliding window panel which is compact, relatively simple in construction, easy to install, relatively inexpensive to manufacture, efficient and more nearly frictionless in operation than heretofore.

A further object of the invention is to provide a center or intermediate guide structure for a window panel in which guide devices on the panel cooperate selectively with fixed guides in the window well and are normally held through resilient means in one guiding position although capable of shifting to another guiding position with respect to the fixed guides, the construction and arrangement being such as to provide a simple, compact and more nearly frictionless guiding means for the window panel.

Other objects of this invention will appear in the following description and appended claims, reference being had to the accompanying drawings forming a part of this specification wherein like reference characters designate corresponding parts in the several views.

Fig. 1 is an inner fragmentary side elevation, partly broken away and partly in section, of an automobile door embodying the invention.

Fig. 2 is an enlarged fragmentary elevation illustrating the window regulator and the upper portion of the window guide mechanism.

Fig. 3 is an enlarged horizontal section taken substantially through lines 3—3 of Fig. 2 looking in the direction of the arrows.

Fig. 4 is an enlarged horizontal section taken substantially through lines 4—4 of Fig. 2 looking in the direction of the arrows.

Fig. 5 is an enlarged horizontal section taken substantially through lines 5—5 of Fig. 2 looking in the direction of the arrows.

Fig. 6 is an enlarged vertical section taken substantially through lines 6—6 of Fig. 2 looking in the direction of the arrows.

Fig. 7 is an enlarged horizontal section taken substantially through lines 7—7 of Fig. 2 looking in the direction of the arrows.

Fig. 8 is a view of the snap-on washer.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated a certain embodiment of the invention applied, by way of example, to an automobile door, such as a front door of an automobile. It will be understood, however, that the embodiment herein exemplified in part or in whole may be used in other relations and in other window structures. In particular it will be understood that the guiding means and the window glass operating mechanism may be utilized not only conjointly as herein shown but also separately, and these may be used generally in vehicle bodies or the like not only in connection with window panels which are adapted to be raised and lowered but also window panels, such as the rear quarter windows of an automobile, which are adapted to be shifted horizontally into open and closed positions. Where the illustrated structure is used in a horizontally movable rear quarter window panel it will be understood that the parts in general will be turned at right angles and suitably attached to the lower edge of the window panel for shifting it horizontally within the rear quarter window opening.

In Fig. 1 there is illustrated a front door D of an automobile including upright side pillars 10 and 11 joined by a header 12, thus providing a window frame in the form of a closed figure defining a main window opening adapted to be closed in part by means of a vertically slidable glass or other transparent panel 13. In the present instance the remaining portion of the window opening is closed by means of a wing type panel 130 of conventional type, the panels 13 and 130 being separated by a vertical guide bar 13a which may either be attached to the forward edge of the panel 13 or fixed within the window opening to provide a guide for the corresponding edge of the panel 13 when raised and lowered. The window frame pillar 11 may be provided with a groove or glass runway channel 14, terminating at the bottom of the window opening and designed to receive the corresponding edge of the panel 13.

Secured to the lower edge of the glass panel 13 is a channel bar or glass retainer member 15 to which the window regulator is adapted to be connected. A depending angle member 16 having a top horizontal flange 16a is spot welded to the bottom of the retainer channel 15. A depending channel shaped carrier plate 17 is detachably secured to the angle bar 16. The channel carrier plate comprises longitudinally extending flanges 17a and 17b. The outer flange 17a has an upper extension 17c provided with outwardly offset laterally extending flange portions 17d and 17e which are secured to the depending flange of the angle bar 16 by means of screws 18 and 19. The screw 19, as shown in Fig. 2, is adjustable in a vertical slot 20 in the flange 17e, thereby permitting the window panel to be adjusted slightly in an angular direction with respect to the carrier plate 17.

The window panel 13 is guided in a generally vertical direction through the medium of roller guide devices cooperable with fixed upright channel guides mounted entirely within the window well below the lower edge of the window opening. For this purpose a guide bracket 30 is attached as by means of spot welding to the outer face of the inner door or body panel 31. The guide bracket 30 has a central web 30a spot welded to the inner door or body panel 31. It will be understood that in conventional practice the inner face of the door or body panel 31 is covered by a suitable trim panel or trim material 32 and that the space between the panel 31 and the outer door or body panel forms the so-called window well into which the window panel 13 is shiftable and within which the operating and guiding mechanism for the panel is mounted.

The guide bracket 30 is shown in the form of an outwardly opening channel which terminates at opposite edges in rolled or formed channel guides 33 and 34 arranged to open towards each other. The channel guide 34 has a central web 34a and longitudinally extending parallel side flanges 34b which terminate in outwardly tapering or flaring portions 34c, one thereof merging into a side flange of the bracket 30. The channel guide 33 is correspondingly formed with a central web 33a and side flanges 33b terminating in outwardly curved or flaring portions 33c, one thereof merging into a side flange of the channel bracket 30. The edges 33c and 34c of the channel guides form parallel double tracks along which the roller guide devices travel, as hereinafter described.

The window panel 13 through the medium of the carrier plate 17 is guided for up and down movement against any material tilting or cocking movement through the medium of a plurality of roller guide devices. In the present instance there are three of these roller guide devices, spaced vertically, and designated generally by the reference numerals 37, 38 and 39. Each roller device 37, 38 and 39 comprises spaced roller elements which are mounted at opposite outer faces of the flanges 17a and 17b of the carrier plate 17. The upper and lower roller devices 37 and 39 are identical and each comprises spaced rollers 42 fixed to a shaft 41 journalled in the flanges 17a and 17b of the carrier plate. Each roller 42 has a tapered or curved peripheral surface shaped substantially to the contour of the track edges 33c and 34c of the channel guides 33 and 34, respectively. The rollers 42 also have opposed marginal annular flanges 42a projecting between the side flanges of the channel guides and overlapping the same so as to prevent transverse displacement of the roller devices, and hence, transverse displacement of the window panel during operation, and preventing the rollers from jumping out or running off the tracks of the channel guides during operation.

The intermediate roller device 38 comprises spaced rollers 43 of smaller diameter than the rollers 42. The rollers 43 are mounted to embrace opposite outer faces of the channeled carrier member 17 and are secured to a shaft 44 which is journalled in the flanges 17a and 17b of the carrier plate. The shaft 44 has an enlarged central portion grooved at 44a to receive the hooked end 45a of a constantly loaded spring 45. The opposite end 45b of the spring is hooked into an aperture in the central web of the channel 17, the spring being provided with a suitable number of intermediate coils and being adapted to exert constant pressure on the shaft 44, thereby pressing the rollers 43 constantly against the tracks 33c of the channel guide 33. The peripheral faces of the rollers 43 are shaped to the contour of the track edges 33c, and these rollers are provided with marginal flanges 43a extending between the side flanges of the channel guide 33 so as to hold the rollers at all times in tracking engagement with the channel guide. The shaft 44 is permitted a limited longitudinal movement with relation to the carrier plate 17, and for this purpose the flanges 17a and 17b of the carrier plate are provided with parallel longitudinal guide slots 46 within which the shaft 44 is shiftable. The enlarged central portion 44 of the shaft overlaps the edges of the guide slots and thus anchors the rollers against transverse displacement.

Referring to Fig. 3 it will be seen that the rollers 42 of the guide device 37, and this also applies to the rollers of the lower guide device 39, have effective engagement normally only with the parallel tracks 34c of the channel guide 34, there being slight clearance spaces 47 between these rollers and the tracks 33c of the channel guide 33. The pressure of the rollers 43 against the channel guide 33 due to the spring 45 will normally hold the upper and lower rollers 42 against the tracks or edges of the opposite channel guide 34, the clearance spaces 47 preventing under such circumstances the upper and lower rollers from being cramped between the channel guides in such manner as to prevent them from rotating when the window panel is raised and lowered. If during operation of the window panel a force is exerted thereon tending to shift the window panel longitudinally, toward the right in Fig. 3, this action will be resisted by the spring pressed rollers 43. However, the panel can shift in its plane longitudinally only to the extent of the clearances 41, at which time the rollers 42 will track along the edges of the channel guide 33. At no time will the upper and lower rollers 37 and 39 track effectively with the edges of both channel guides so as to prevent free rotation of the rollers.

It will be seen that the vertically spaced arrangement of the roller guide devices along the channel guides will hold the window glass against any material tilting or cocking in its plane, the clearances 47 being insufficient to permit any material or noticeable tilting movement. In the event the glass tends to tilt in its plane this will be limited to the slight distance required for one of the rollers 37, 39 to move from one guide to the other. In such case one of these rollers will travel along one guide and the other roller will travel along the other guide. In other words the slight normal clearance between rollers 37, 39 and guide 33 will permit slight relative movement longitudinally of these rollers about the intermediate roller 38 which will yield sufficiently to permit rollers 37 and 39 to move to positions in which they will travel on both guides.

In the present instance the window panel is raised and lowered through the medium of a window regulator comprising an operating arm connected to the carrier plate 17 at a point between the upper roller device 37 and the intermediate spring pressed roller device 38. The illustrated window regulator comprises a pressed metal mounting plate 48 having screw bosses or the like 49 by which the mounting plate may be secured by screws to the face of the inner door or body panel 31 within the window well. A sector gear 50 is secured to a pivot stud 51 journalled in the mounting plate. This gear is rotated through the medium of a pinion 52 carried by a handle shaft 53 which in turn is opertaed through the usual handle at the inner side of the trim panel. The handle shaft 53 is of the sectional type including any conventional type of friction clutch. Secured to the gear 50 through the medium of the stud 51 and a rivet 55 is a main swinging driving arm 54, the arm being embossed or offset outwardly at 54a to extend to the outer side of and spaced from the channel guides and roller guide devices. Pivoted at 56 to the outer end of the arm 54 is a relatively short swinging arm 57. This arm is of elbow construction having a depending right angle extension 58 to the end of which is pivoted at 59 a control link 60 pivoted at its inner end at 61 to the mounting plate 48 at a predetermined or selected point below the pivot 51 of the gear 50 and driving arm 54. A suitable counterbalancing spring 62 of the spirally wound type is secured at its inner end to the stud 51 and at its outer end to a lug struck out from the mounting plate 48. This spring is constructed to substantially counterbalance the weight of the window panel 13.

The outer end of the arm 57 is pivotally connected to the carrier plate 17 at a single point through the medium of a transverse stud 63 riveted to the end of the arm. This stud has two diameters 64 and 65 and terminates in a rounded nose or head 67 separated from the larger diameter 65 by an annular groove 66.

Slidable upon the portion 64 of the stud is a conical type washer 68 recessed to receive one end of a compression spring 69, the spring being interposed between the washer and the end of the arm 57. The stud 63 extends through a short horizontally extending guide slot 71 in the flange 17a of the carrier plate. The upper and lower edges of the guide slot are pressed inwardly to provide conical portions to receive the washer 68, the edges of the guide slot being rolled to provide bearings for the portion 65 of the stud 63. The flange 17b of the carrier plate also has a guide slot 71a parallel to and in line with the slot 71 and through which the stud 63 extends. The stud is locked within the guide slots 71 and 71a through the medium of a snap-on washer 72. This washer comprises a spring steel disk 73 embraced around its peripheral edge by a ring like grooved reinforcing member 74. The washer 73 is provided with flared or tapered spring fingers or prongs 75 terminating in a generally circular opening of less diameter than the head 67 of the stud.

The window regulator may be readily installed and connected to the carrier plate 17 by springing the arm 57 away from the flange 17a of the plate, lining up the stud 63 with the guide slots 71 and 71a, and then shifting the stud through these slots to the position shown in Fig. 6. The arm 57 is then forced inwardly slightly against the pressure of the spring 69 and the washer 72 is forced over the end of the stud. The prongs 75 spring out or spread as they pass over the head 67, and then spring into the groove 66, thus locking the washer upon the end of the stud and preventing disengagement of the regulator arm 57.

From the foregoing it will be seen that by virtue of the present invention an extremely compact, simple, efficient and economical window control mechanism has been provided which is practical for use, particularly in automobiles, and very easy to install. The guides may be arranged in the well substantially at the center of the window glass and no longer is there need for side edge guides for the glass. The vertically spaced roller guide devices in cooperation with the channel guides hold the window for travel in substantially a straight line path. Not only does the support for the roller devices afford a connection for the window regulator but the construction permits a single point operative connection for the regulator. The regulator in turn is constructed so that the single point of connection 63 with the roller guide carrier travels vertically in a very nearly straight line. The slight longitudinal travel of the stud 63 in the slot 71 intermediate the halfway position and the upper and lower limits is insufficient to produce any appreciable drag on the window panel which would produce undue friction on the guides. Thus, it is possible, by reason of the invention, to reduce the cost as well as the weight of the entire window control mechanism.

Great ease and simplicity is also achieved in installation. The window regulator, the guides 33 and 34, the carrier plate with the roller guide devices 37, 38 and 39 are all installed or mounted within the window well and the regulator connected to the carrier 17 before it is necessary to install the window panel 13. This panel may be installed by tilting it into the window opening and dropping the lower edge down through the slot along the lower edge of the window opening. It may be quickly attached to the carrier plate 17 by means of the screws 18 and 19 and at the same time lined up accurately by reason of the adjusting slot 20. An important advantage resides in the present center guide in avoiding breakage of window panels during installation of doors on the assembly line. In order to get accurate fit of steel doors on the line it is customary to use tools to spring or twist the doors. Where the side edges of the glass are held in guides, as heretofore, the glass frequently breaks, when the doors are warped or bent into place on the line. Such breakage is substantially eliminated by virtue of the present guide structure.

I claim:

1. A guide structure for a window panel mounted for sliding movement in a window of a vehicle body having a well and a pair of spaced upright guides in said well each having transversely spaced tracks, a guide roller device adapted to be mounted to the lower edge of the panel for travel between said guides and having its axis of rotation extending transversely to the plane of the panel, said roller device including transversely spaced peripheral portions having rolling engagement with the spaced tracks of one or the other of said guides, and resilient means normally urging said guide roller device into position to travel on the tracks of one upright guide but yieldable to permit said guide roller to travel on the tracks of the other guide.

2. A guide structure for a window panel mounted for sliding movement in a window of a vehicle body having a well and a pair of spaced upright guides in said well each having transversely spaced tracks, vertically spaced guide roller devices adapted to be mounted to the lower edge of the panel for travel between said guides and having their axes of rotation extending transversely to the plane of the panel, each roller device including transversely spaced peripheral portions having rolling engagement with the spaced tracks of one or the other of said guides, and resilient means interposed between said roller devices and normally urging the same into positions to cause said roller devices to travel on the tracks of one upright guide but yieldable to permit relative movement of said roller devices into positions to travel on the tracks of both guides.

3. A guide structure for a window panel mounted for sliding movement in a window of a vehicle body having a well and a pair of spaced upright guides in said well each having transversely spaced tracks, a guide roller device adapted to be mounted to the lower edge of the panel for travel between said guides and having its axis of rotation extending transversely to the plane of the panel, said roller device including transversely spaced peripheral portions having rolling engagement with the spaced tracks of one or the other of said guides, and resilient means normally urging said guide roller device into position to travel on the tracks of one upright guide but yieldable to permit said guide roller to travel on the tracks of the other guide, said resilient means comprising a spring pressed roller device having transversely spaced peripheral portions adapted to travel on the tracks of one of said guides.

4. A guide structure for a window panel mounted for sliding movement in a window of a vehicle body having a well and a pair of spaced upright guides in said well each having transversely spaced tracks, vertically spaced guide roller devices adapted to be mounted to the lower edge of the panel for travel between said guides and having their axes of rotation extending transversely to the plane of the panel, each roller device including transversely spaced peripheral portions having rolling engagement with the spaced tracks of one or the other of said guides, and resilient means interposed between said roller devices and normally urging the same into positions to cause said roller devices to travel on the tracks of one upright guide but yieldable to permit relative movement of said roller devices into positions to travel on the tracks of both guides, said resilient means comprising a spring pressed roller device having transversely spaced peripheral portions adapted to travel on the tracks of one of said guides.

5. A guide structure for a window panel mounted for sliding movement in a window of a vehicle body having a well and a pair of spaced upright guides in said well each having transversely spaced tracks, a guide roller device adapted to be mounted to the lower edge of the panel for travel between said guides and having its axis of rotation extending transversely to the plane of the panel, said roller device including transversely spaced peripheral portions having rolling engagement with the spaced tracks of one or the other of said guides, resilient means normally urging said guide roller device into position to travel on the tracks of one upright guide but yieldable to permit said guide roller to travel on the tracks of the other guide, and a carrier for said roller device attachable to the lower edge of the panel and extending between the spaced peripheral portions of said roller device.

6. A guide structure for a window panel mounted for sliding movement in a window of a vehicle body having a well and a pair of spaced upright guides in said well each having transversely spaced tracks, vertically spaced guide roller devices adapted to be mounted to the lower edge of the panel for travel between said guides and having their axes of rotation extending transversely to the plane of the panel, each roller device including transversely spaced peripheral portions having rolling engagement with the spaced tracks of one or the other of said guides, resilient means interposed between said roller devices and normally urging the same into positions to cause said roller devices to travel on the tracks of one upright guide but yieldable to permit relative movement of said roller devices into positions to travel on the tracks of both guides, and a carrier for said roller devices attachable to the lower edge of the panel and extending between the spaced peripheral portions of said roller devices.

7. A guide structure for a window panel mounted for sliding movement in a window of a vehicle body having a well and a pair of spaced upright guides in said well each having transversely spaced tracks, a guide roller device adapted to be mounted to the lower edge of the panel for travel between said guides and having its axis of rotation extending transversely to the plane of the panel, said roller device including transversely spaced peripheral portions having rolling engagement with the spaced tracks of one or the other of said guides, resilient means normally urging said guide roller device into position to travel on the tracks of one upright guide but yieldable to permit said guide roller to travel on the tracks of the other guide, said resilient means comprising a spring pressed roller device having transversely spaced peripheral portions adapted to travel on the tracks of one of said guides, and a carrier for said roller devices attachable to the lower edge of the panel and extending between the spaced peripheral portions of said roller devices.

8. A guide structure for a window panel mounted for sliding movement in a window of a vehicle body having a well and a pair of spaced upright guides in said well each having transversely spaced tracks, vertically spaced guide roller devices adapted to be mounted to the lower edge of the panel for travel between said guides and having their axes of rotation extending transversely to the plane of the panel, each roller device including transversely spaced peripheral portions having rolling engagement with the spaced tracks of one or the other of said guides, resilient means normally urging said roller devices into positions to cause each roller device to travel on the tracks of one upright guide but yieldable to permit either of said roller devices to travel on the tracks of the other guide, said resilient means comprising a spring pressed roller device having transversely spaced peripheral portions adapted to travel on the tracks of one of said guides, and a carrier for said roller devices attachable to the lower edge of the panel and extending between the spaced peripheral portions of said roller devices.

9. A roller guide structure for a sliding window panel comprising two spaced upright channel guides each having transversely spaced tracks, a roller guide carrier extending between said guides in the longitudinal plane thereof, a roller guide device mounted on said carrier and including transversely spaced peripheral portions on opposite sides of the carrier having rolling engagement with the spaced tracks of one guide.

10. A roller guide structure for a sliding window panel comprising two spaced upright channel guides each having transversely spaced tracks, a roller guide carrier extending between said guides in the longitudinal plane thereof, a plurality of vertically spaced roller guide devices mounted on said carrier and each including transversely spaced peripheral portions on opposite sides of the carrier having rolling engagement with the spaced tracks of one guide.

11. A roller guide structure for a sliding window panel comprising two spaced upright channel guides each having transversely spaced tracks, a roller guide carrier extending between said guides in the longitudinal plane thereof, a roller guide device mounted on said carrier and including transversely spaced peripheral portions on opposite sides of the carrier having rolling engagement with the spaced tracks of one guide, and resilient means on the carrier urging the guide device into engagement with one guide but yieldable to permit its rolling engagement with the other guide.

12. A window control mechanism for a window panel mounted for sliding movement in a window having a well and a pair of spaced upright guides with guide flange means extending longitudinally in the direction of the plane of the window panel, a carrier attachable to the lower edge of the panel and extending between said spaced flange means, spaced guide devices on said carrier each having engagement with the flange means of one guide, each guide device having spaced flange portions overlapping two sides of the flange means of a guide and said devices having tracking portions contacting the outer edges of the flange means.

13. A window control mechanism for a window panel mounted for sliding movement in a window having a well and a pair of spaced upright guides with guide flange means extending longitudinally in the direction of the plane of the window panel, a carrier attachable to the lower edge of the panel and extending adjacent said spaced flange means, spaced guide devices on said carrier each having engagement with the flange means of one guide, each guide device having spaced flange portions overlapping two sides of the flange means of a guide and said devices having tracking portions contacting the outer edges of the flange means.

JOHN H. ROETHEL.